May 14, 1957  J. S. COCKRELL  2,792,121
FILTER
Filed Jan. 6, 1954  2 Sheets-Sheet 1

INVENTOR.
Jesse S. Cockrell,
BY Victor J. Evans & Co.
ATTORNEYS

May 14, 1957 — J. S. COCKRELL — 2,792,121
FILTER
Filed Jan. 6, 1954 — 2 Sheets-Sheet 2
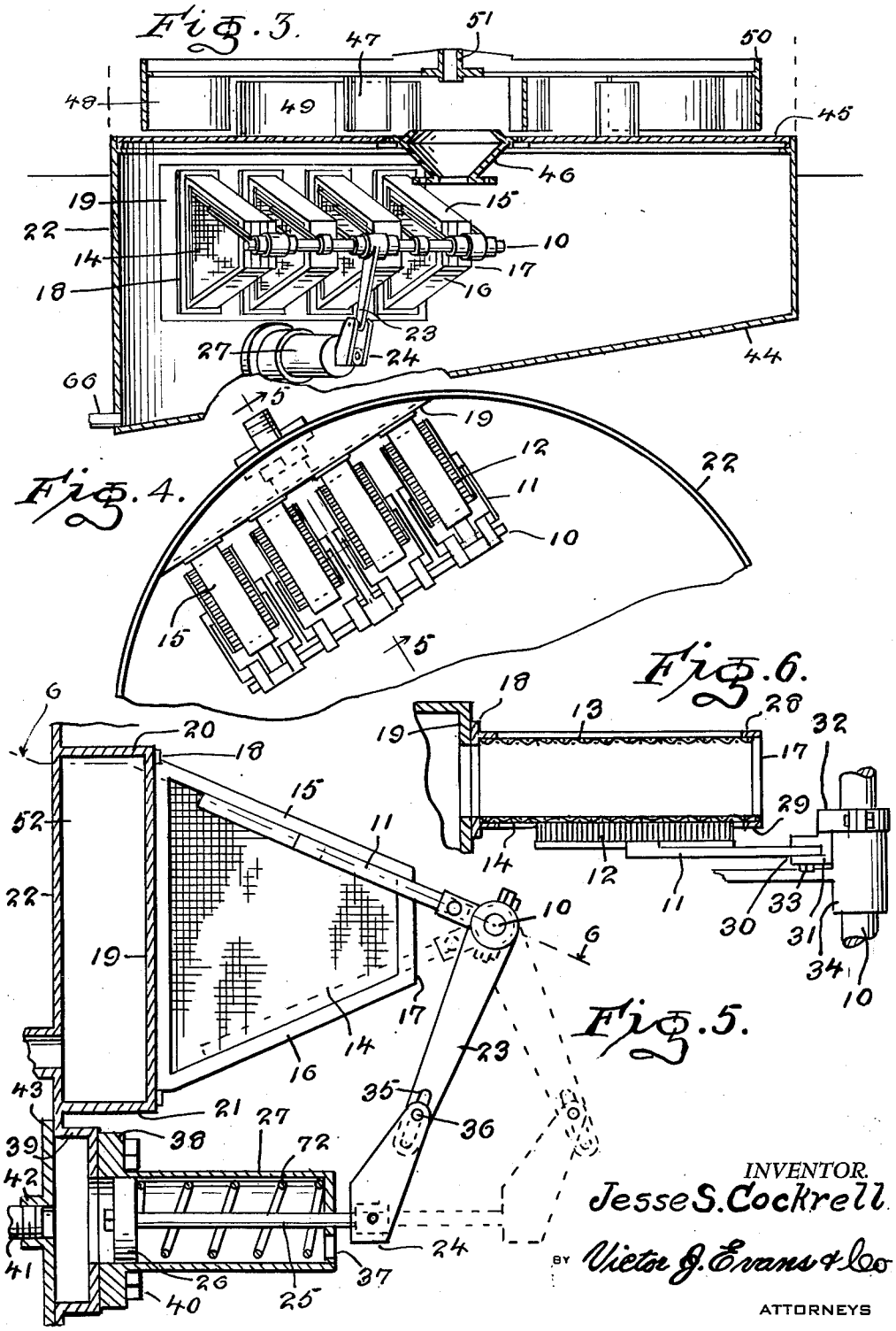
INVENTOR.
Jesse S. Cockrell
BY Victor J. Evans & Co
ATTORNEYS

United States Patent Office 2,792,121
Patented May 14, 1957

2,792,121

FILTER

Jesse S. Cockrell, Norfolk, Va.

Application January 6, 1954, Serial No. 402,509

5 Claims. (Cl. 210—334)

This invention relates to filters of the type having screens in combination with brushes for wiping surfaces of the screens, and in particular a filter including a plurality of substantially trapezoidal-shaped boxlike elements with screens in vertical sides thereof and with brushes carried by arms extended from a pivotally mounted shaft whereby with the shaft positioned at the short sides of the filters and reciprocated by a hydraulic cylinder having a piston rod pivotally connected to an arm extended from the shaft the brushes move across the screens thereby cleaning the screens continuously, or as desired.

The purpose of this invention is to provide a filter for comparatively rough use, such as removing sand, dirt, and the like from water used for washing motor vehicles and whereby screens of the filter may be maintained in a comparatively clean condition.

Screens and filtering devices such as used for chemicals and other comparatively fine mesh products are not satisfactory for rough duty such as removing heavy mud and the like from water used for washing motor vehicles and for this reason water used for washing vehicles is very seldom reclaimed. In some areas, however, and particularly where lack of rain has made the use of water for washing vehicles prohibitive, it is necessary to filter and reuse the water. With this thought in mind this invention contemplates a battery of screens having wiper elements adapted to be moved across surfaces thereof whereby with the filters positioned in the side of a sump or tank water, free of sand, dirt, and the like may be withdrawn from the tank.

The object of this invention is, therefore, to provide a filter adapted to be connected in an outlet connection of a sump or tank in which cleaning elements of the filter are adapted to be actuated continuously.

Another object of the invention is to provide a filter in which screening elements thereof are accessible so that each screening element may be removed and replaced independently.

Another object of the invention is to provide a filter adapted to be installed in a sump or tank in which the filter is of a comparatively simple and economical construction.

With these and other objects and advantages in view the invention embodies a filter unit comprising a plurality of substantially trapezoidal-shaped sections having spaced vertically disposed side walls formed with filtering elements, connected with upper, lower, and end walls and having brushes mounted to coact with the filter elements for wiping materials deposited on the elements therefrom, the brushes being carried by a shaft having reciprocating means in combination therewith whereby the shaft is reciprocated to move the brushes over the filter elements.

Other features and advantages of the invention will appear from the following description taken in connection with the drawings, wherein:

Figure 3 is a vertical section through the sump illustrating the relative positions of the filter elements therein, said filter elements being shown in elevation.

Figure 4 is a plan view of the filter elements with part of the sump broken away.

Figure 5 is a cross section through the sump portion of the tank taken on line 5—5 of Fig. 4 and showing a brush in the position of wiping a screen on one side of the section of the filter, the parts being shown on an enlarged scale.

Figure 6 is a detail showing a sectional plan taken on line 6—6 of Fig. 5 also showing one of the filter elements in combination with one of the wiping brushes.

Figure 2:
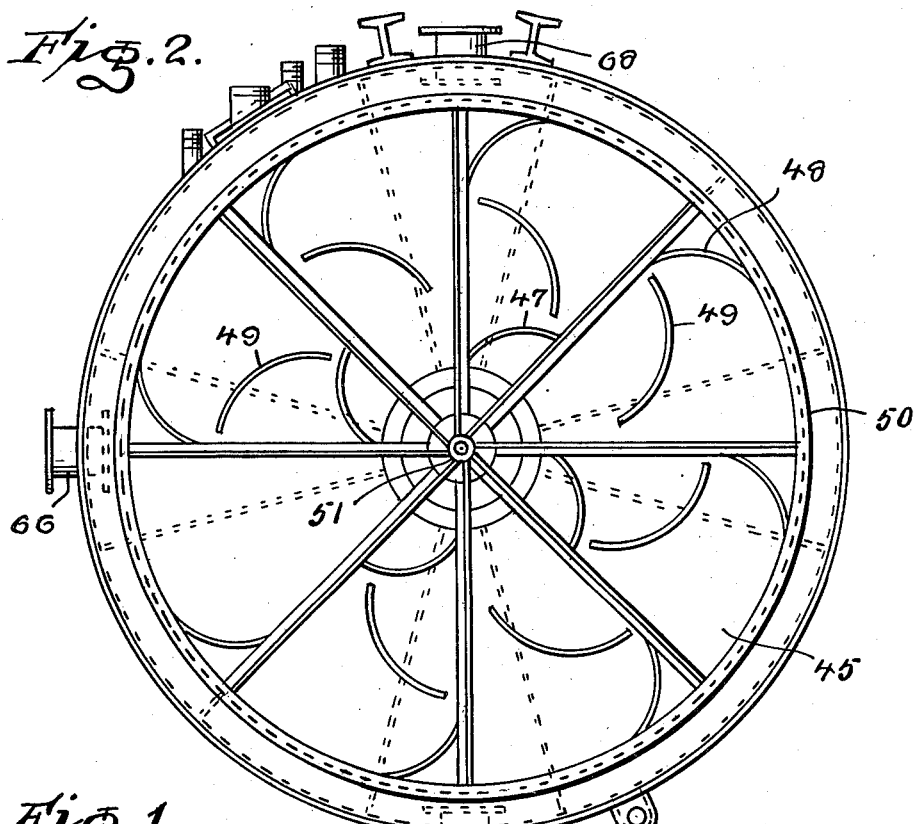
Figure 2 is a plan view showing a rotor positioned on the sump in which the filter is positioned in which arcuate blades of the rotor coact with intermediate stationary blades to guide pellets being returned from car washing steps into the sump.

Referring now to the drawings wherein like reference characters denote corresponding parts the improved filter of this invention includes a shaft 10 having arms 11 with brushes 12 thereon extended therefrom, filter sections having screens 13 and 14 mounted by frames in casings having upper walls 15, lower walls 16 and end walls 17, the walls being mounted with frames 18 on outer walls 19 of a casing having upper walls 20, lower walls 21, and a continuous inner wall 22 and, as shown in Fig. 5 an arm 23 on the shaft 10 is connected to a shoe 24 on the end of a piston rod 25 which extends from a piston 26 in a cylinder 27, positioned below the filter elements.

The wire mesh screens 13 and 14 are secured by frames 28 and 29 on the sides of the sections of the filter and with these sections positioned as shown in Fig. 4 one of the brushes 12 is positioned on each side of each section whereby the filter screens on both sides of the sections are wiped simultaneously.

As illustrated in Fig. 6 the brush arms 11 are secured in slots 30 in bifurcated sections 31 extended from clamps 32 on the shaft 10 by bolts 33 at the ends of bearings 34.

The extended end of the arm 23 is provided with an elongated slot 35 and pins 36, in the upper end of the shoes 24 are free to slide in the slots 35 as the shoe is driven outwardly and inwardly to reciprocate the shaft.

The cylinder 27 is provided with an opening 37 in the outer end and a flange 38 on the inner end is secured to a box-like section 39 of the plate 22 with bolts 40. The piston is actuated by fluid under pressure supplied through a connection 41 that is threaded into a boss 42 on the outer surface of a plate 43 positioned against the plate 22.

In the design illustrated in the drawings the plate 22 forms the wall of a sump having a base 44 and a cover 45. Water is supplied to the sump through a center fitting or eductor 46 and with the water supplied from a device, such as a motor vehicle laundry, small pellets of rubber or the like are driven toward the fitting 46 with a rotor 50 having inner arcuate blades 47, outer arcuate blades 48 and between the blades 47 and 48 are intermediate stationary arcuate blades 49 mounted on the plate 45, and whereby the pellets travel continuously as they pass across the upper surface of plate 45 above which the traveling blades 47 and 48 are positioned. The rotor 50 is provided with a centrally disposed hub 51 by which it is mounted on a suitable shaft for turning the rotor as disclosed in an application filed January 6, 1954, with the Serial No. 445,529, now issued as Patent No. 2,716,772 for a motor vehicle laundry.

Figure 1:
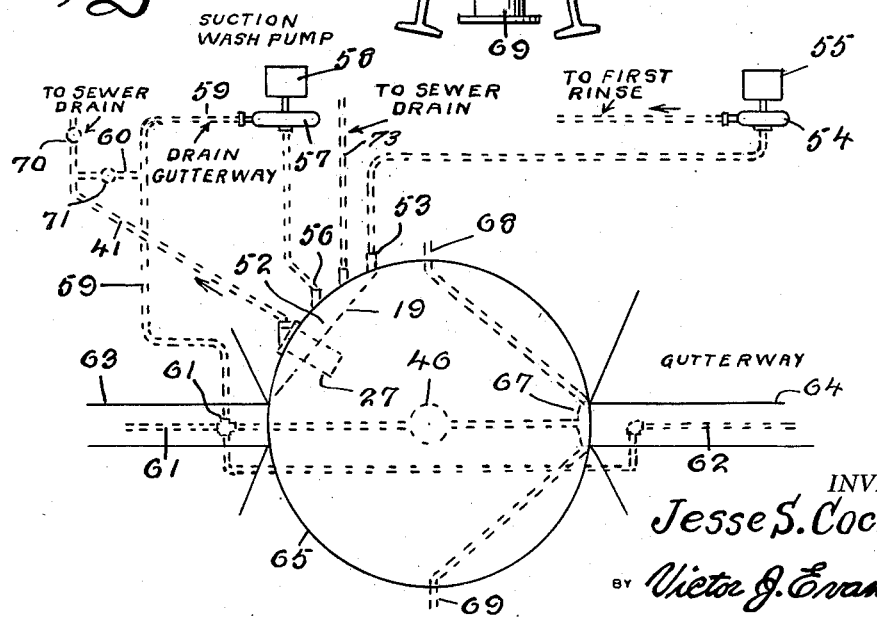
Figure 1 is a diagrammatic view illustrating the position of the filter in a sump and showing drain and other connections extended from the compartment in the sump in which the filtering elements are positioned.

As illustrated in Figure 1, the filter compartment 52, positioned between the plate 19 and wall 22 of the sump, is provided with a connection 53 through which filtered water is drawn by a pump 54, driven by a motor 55, for the first rinse operation of the motor vehicle laundry. A connection 56 also extends from the compartment 52 to a pump 57 driven by a motor 58 and a discharge connection 59 from the pump 57 is connected by a cross connection 60 to the supply connection 41 of the cylinder 27.

The connection 59 also extends to a fitting 61 from which conduits 62 extend for supplying water to flushing spray nozzles in troughs or trenches 63 and 64 which drain back to the sump 65.

The fitting 61 is also connected to a connection 66 whereby water is supplied from the pump 57 to the eductor 46 from which water and pellets are carried through a fitting 67 to washing spray nozzles of the motor laundry through connections 68 and 69.

The connection 41 is provided with a drain connection in which a valve 70 is positioned and a similar valve, as indicated by the numeral 71 is also provided in the cross connection 60.

The cylinder 27 is provided with a spring 72 which returns the piston to the position shown in Figure 5, as the pressure is relieved.

In use the combination of water, dirt, sand, and pellets from a vehicle being washed is supplied to the sump through the perforated plate 45 and with a substantial part of the dirt, grit and the like filtered from the water the water passes through the filters into the compartment 52 from which it is taken for reuse. Sand, grit, and the like are drawn from the sump through a drain connection 73.

With the parts assembled in this manner the brushes 12 may be actuated to travel across the filtering elements continuously or at regular intervals or as desired. Both the brushes and screening elements may readily be removed and replaced.

Each unit of this filter is adapted to function independently and, as illustrated in Figures 3 and 4, the individual filtering elements are adapted to be mounted on a wall of a tank or on a flat section or partition positioned in the side of a tank whereby an accumulation of fluid in the tank passes through the filtering elements in the sides of the box-like units so that water or other fluid in the tank is filtered as it passes from an outlet opening of the tank. The openings in which the filtering units are installed provide the outlet openings. In order to expedite the operation of the filters, the filtering elements in the sides of the box-like units are wiped continuously whereby residue or sludge removed from the water is wiped from the filtering units and deposited into the tank so that it may be drained off. The hydraulic cylinder provides actuating means for the wiping elements and by using a hydraulic cylinder the operating device is adapted to be installed in a tank where it is subjected to water or other fluid therein.

It will be understood that modifications, within the scope of the appended claims, may be made in the design and arrangement of the parts without departing from the spirit of the invention.

What is claimed is:

1. In a filter, the combination which comprises a tank having a vertically disposed partition therein, a trapezoidal-shaped casing having spaced parallel vertically disposed sides mounted on the partition of the tank and extended into the tank, wire mesh screens positioned in frames mounted on the sides of the casing, a shaft spaced from the extended end of said casing, brushes carried by arms extended from said shaft and positioned to wipe the wire mesh screens of said section, an arm extending from said shaft and means actuating the arm to rotate the shaft for reciprocating the brushes.

2. A filter comprising a trapezoidal-shaped casing having spaced parallel vertically disposed sides with upper, lower, and vertically disposed end walls, a shaft spaced from the end wall at the extended end of the casing, filter elements mounted in said vertically disposed sides of the casing, brushes carried by the shaft and positioned to wipe said filter elements, an arm extended from the shaft, a hydraulic cylinder having a piston therein and a piston rod extended from one end, means for operatively connecting the extended end of the piston rod to the arm extended from the shaft for actuating the shaft to reciprocate the brushes, and a connection through which fluid under pressure is supplied to the cylinder.

3. A filter comprising a trapezoidal-shaped casing having spaced parallel vertically disposed sides, with upper, lower, and vertically disposed end walls, filter elements mounted in said vertically disposed sides of the casing, the vertically disposed end wall on the extended portion of the casing being shorter than the end wall on the opposite end, a shaft spaced from the end wall of the extended end of the casing, brushes carried by the shaft and positioned to wipe said filter elements, an arm extended from said shaft, and a hydraulic cylinder connected to the arm for actuating the shaft whereby the brushes are moved across the filtering elements.

4. In a filter, the combination which comprises a tank having a vertically disposed partition in one side thereof, a trapezoidal-shaped casing mounted on said partition and extended into the tank, filter elements mounted in the sides of the casing, a shaft spaced from the extended end of the casing in which the filter elements are positioned, an arm depending from the shaft, and a hydraulic cylinder having a piston therein with a piston rod extended from one end of the cylinder and operatively connected to the arm depending from the shaft for reciprocating the shaft to operate the filter elements.

5. A filter comprising a trapezoidal-shaped casing having spaced parallel vertically disposed sides with upper, lower, and end walls, filter elements mounted in said vertically disposed sides, a shaft spaced from the end wall on the extended end of the casing, brushes carried by the shaft and positioned to wipe said filter elements, an arm extended from the shaft, a hydraulic cylinder connected to the arm for actuating the shaft whereby the brushes are moved across the filtering elements, and a spring in said cylinder for actuating said brushes in one direction.

References Cited in the file of this patent

UNITED STATES PATENTS

| | | |
|---|---|---|
| 683,386 | Corlett | Sept. 24, 1901 |
| 803,517 | Adams et al. | Oct. 31, 1905 |
| 1,707,846 | Corkran | Apr. 2, 1929 |
| 2,077,744 | Cuno et al. | Apr. 20, 1937 |
| 2,391,704 | Hughes | Dec. 25, 1945 |
| 2,395,225 | Kurz | Feb. 19, 1946 |
| 2,592,972 | Strassheim | Apr. 15, 1952 |